(12) United States Patent
Biemond et al.

(10) Patent No.: US 10,828,802 B2
(45) Date of Patent: Nov. 10, 2020

(54) METHODS FOR TREATMENT AND MANUFACTURE OF PELLETS

(71) Applicant: SAUDI BASIC INDUSTRIES CORPORATION, Riyadh (SA)

(72) Inventors: Gerard Jan Eduard Biemond, Brunssum (NL); Carmela Tufano, Maastricht (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 428 days.

(21) Appl. No.: 15/113,240

(22) PCT Filed: Jan. 28, 2014

(86) PCT No.: PCT/EP2014/051574
§ 371 (c)(1),
(2) Date: Jul. 21, 2016

(87) PCT Pub. No.: WO2014/118144
PCT Pub. Date: Aug. 7, 2014

(65) Prior Publication Data
US 2016/0346957 A1    Dec. 1, 2016

(30) Foreign Application Priority Data
Feb. 1, 2013    (EP) .................................... 13000500

(51) Int. Cl.
*B29B 9/16* (2006.01)
*B29B 9/06* (2006.01)
(Continued)

(52) U.S. Cl.
CPC .................. *B29B 9/16* (2013.01); *B29B 9/06* (2013.01); *B29B 9/14* (2013.01); *B29B 15/122* (2013.01);
(Continued)

(58) Field of Classification Search
CPC ..................................... B29B 9/16; B29B 9/06
(Continued)

(56) References Cited

U.S. PATENT DOCUMENTS 4,043,779 A    8/1977    Schaefer
4,338,233 A    7/1982    Das et al.
(Continued)

FOREIGN PATENT DOCUMENTS

DE    3806661 A1    9/1989
EP    0206189 A1    12/1986
(Continued)

OTHER PUBLICATIONS

Iyer, Manufacture of Powder-Impregnated Thermoplastic Composites, Journal of Thermoplastic Composite Materials, vol. 3, Oct. 1990, p. 325-355 (Year: 1990).*
(Continued)

*Primary Examiner* — Tabatha L Penny
(74) *Attorney, Agent, or Firm* — Cantor Colburn LLP

(57) ABSTRACT

Method for treatment of pellets (1) comprising a thermoplastic polymer sheath (2) surrounding glass filaments (3), which glass filaments are covered at least in part with an impregnating agent and extend in a longitudinal direction of the pellets, the method comprising maintaining the pellets for a period of time at an elevated temperature. The method results in an improved impregnation of glass filaments in the pellets resulting in (a) lower amounts of glass separating from the pellets when such are subjected to repetitive mechanical loads and (b) less agglomerations of glass filaments in moulded products manufactured from the pellets.

20 Claims, 1 Drawing Sheet

Figure 1:
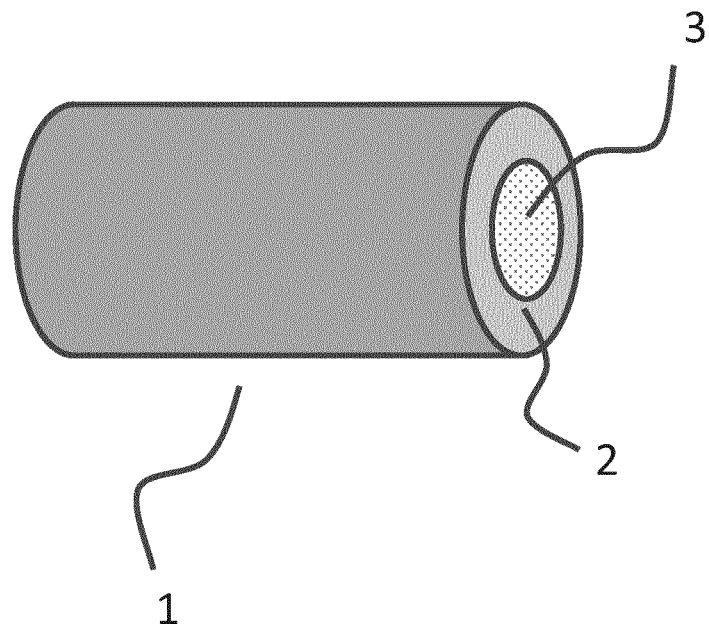

(51) Int. Cl.
*B29B 9/14* (2006.01)
*B29B 15/12* (2006.01)
*B29K 23/00* (2006.01)
*B29K 309/08* (2006.01)

(52) U.S. Cl.
CPC ...... *B29K 2023/12* (2013.01); *B29K 2309/08* (2013.01); *B29K 2995/0041* (2013.01)

(58) Field of Classification Search
USPC ........................................................ 427/212
See application file for complete search history.

(56) References Cited

U.S. PATENT DOCUMENTS

| | | | |
|---|---|---|---|
| 4,537,610 A | | 8/1985 | Armstrong et al. |
| 5,998,029 A | | 12/1999 | Adzima et al. |
| 6,045,912 A | * | 4/2000 | Taguchi .................... B29B 9/14 |
| | | | 428/357 |
| 6,291,064 B1 | | 9/2001 | Kadowaki et al. |
| 2008/0118728 A1 | | 5/2008 | Magley et al. |
| 2011/0172382 A1 | * | 7/2011 | Yeh ........................ B01J 19/002 |
| | | | 526/282 |

FOREIGN PATENT DOCUMENTS

| | | | | |
|---|---|---|---|---|
| EP | 0397505 | A2 | 11/1990 | |
| EP | 0491043 | A1 | 6/1992 | |
| EP | 0900638 | A2 | 3/1999 | |
| EP | 1364760 | A1 | 11/2003 | |
| EP | 1460166 | A1 | 9/2004 | |
| EP | 2138530 | A1 | 12/2009 | |
| GB | 2333737 | * | 8/1999 | ............... B29B 9/14 |
| GB | 2333737 | A | 8/1999 | |
| JP | 2008291192 | A | 12/2008 | |
| WO | 9806551 | A2 | 2/1998 | |
| WO | p965661 | A1 | 12/1999 | |
| WO | 2007008633 | A2 | 1/2007 | |
| WO | 2009080281 | A1 | 7/2009 | |
| WO | WO-2009080281 | A1 * | 7/2009 | ............... B29B 9/14 |

OTHER PUBLICATIONS

Peltonen, The influence of melt impregnation parameters on the degree of impregnation of a polypropylene/glass fiber prepreg, Journal of Thermoplastic Composite Materials, Oct. 1992, p. vol. 5 issue 4, p. 318-343 (Year: 1992).*
International Search Report for International Application No. PCT/EP2014/051574; International Filing Date: Jan. 28, 2014; dated May 14, 2014; 6 Pages.
Machine Translation of DE3806661(A1); Date of Publication: Sep. 14, 1989; 4 Pages.
Written Opinion of the International Searching Authority for International Application No. PCT/EP2014/051574; International Filing Date: Jan. 28, 2014; dated May 14, 2014; 7 Pages.
Machine Translation of JP2008291192; Date of Publication: Dec. 4, 2008; 12 Pages.
Indian Examination Report dated Jan. 30, 2019, pp. 6.

* cited by examiner

US 10,828,802 B2

METHODS FOR TREATMENT AND MANUFACTURE OF PELLETS

CROSS REFERENCE TO RELATED APPLICATIONS

This application is a 371 of International Application No. PCT/EP2014/051574, filed Jan. 28, 2014, which claims priority European Application No. 13000500.2, filed Feb. 1, 2013 which are incorporated herein by reference in their entirety.

The present invention relates to a method for treatment of pellets comprising a thermoplastic polymer sheath surrounding glass filaments, which glass filaments are covered at least in part with an impregnating agent and extend in a longitudinal direction of the pellets.

The present invention further relates to pellets obtained by this method and their use.

The present invention further relates to a method for producing pellets comprising a thermoplastic polymer sheath surrounding glass filaments, which glass filaments are covered at least in part with an impregnating agent and extend in a longitudinal direction of the pellets.

The present invention further relates to a method for reducing an amount of glass filaments separating from pellets comprising a thermoplastic polymer sheath surrounding the glass filaments, which glass filaments are covered at least in part with an impregnating agent and extend in a longitudinal direction of said pellets, when such pellets are subjected to repetitive mechanical loads or upon transportation of the pellets through a piping system or upon transportation by means of a vibrating conveyor means.

The present invention further relates to a method for reducing agglomerates of glass filaments in moulded parts manufactured by moulding pellets comprising a thermoplastic polymer sheath surrounding the glass filaments, which glass filaments are covered at least in part with an impregnating agent and extend in a longitudinal direction of said pellets.

In general the present invention lies in the technical field of long glass filament reinforced thermoplastic polymers.

Pellets comprising a thermoplastic polymer sheath surrounding glass filaments, which glass filaments are covered at least in part with an impregnating agent and extend in a longitudinal direction of said pellets, are commercially available from Saudi Basic Industries Corporation under the brand name Stamax.

A process for manufacturing such pellets is known from WO 2009/080281, which process comprises the subsequent steps of:
a) unwinding from a package of at least one continuous glass multifilament strand containing at most 2% by mass of a sizing composition;
b) applying from 0.5 to 20% by mass of an impregnating agent to said at least one continuous glass multifilament strand to form an impregnated continuous multifilament strand;
c) applying a sheath of thermoplastic polymer around the impregnated continuous multifilament strand to form a sheathed continuous multifilament strand; characterised in that the impregnating agent is non-volatile, has a melting point of at least 20° C. below the melting point of the thermoplastic matrix, has a viscosity of from 2.5 to 100 cS at application temperature, and is compatible with the thermoplastic polymer to be reinforced.

According to WO 2009/080281 the sheathed continuous glass multifilament strand may be cut into pellets having a length of from 2 to 50 mm, preferably from 5 to 30 mm, more preferably from 6 to 20 mm and most preferably from 10 to 15 mm.

The pellets may be used for producing articles by suitable moulding techniques, such as injection moulding, compression moulding, extrusion and extrusion compression moulding. Injection moulding is widely used to produce articles such as automotive exterior parts like bumpers, automotive interior parts like instrument panels, or automotive parts under the bonnet.

EP 0491043 discloses a process for producing a fiber-reinforced polyamide resin composition suitable for use as a molding material. The obtained composition has a high adhesive strength between the reinforcing fiber and the resin and imparts excellent properties to a molding product.

WO 99/65661 discloses a process for the continuous preparation of a coated, long fiber reinforcing composite structure suitable for the preparation of shaped articles. The process is characterized by impregnating a plurality of continuous lengths of reinforcing fiber strands with a first thermoplastic resin material while continuously drawing the fiber strands to produce a long fiber reinforcing composite structure followed by coating a second thermoplastic resin material containing additives onto the long fiber reinforcing composite structure to produce a coated, long fiber reinforcing composite structure.

WO 2007/008633 discloses a process to make an electrically conductive long fiber thermoplastic concentrate wherein an electrically conductive continuous fiber strand is coated with an aqueous melt-kneaded thermoplastic dispersion, dried, and chopped.

DE 3806661 discloses a method of manufacturing plastics articles reinforced with short fibres, in which first of all fibres of virtually unlimited length are sheathed in plastic, granules are produced from these sheathed fibres and the granules are worked into the fibre-reinforced plastics article.

US 2008/118728 discloses an article including at least one layer of a compound disposed on at least a portion of a glass-containing substrate, wherein the compound includes a polyolefin having a deformation temperature of less than 110° C., and a dispersion stabilizing agent, wherein the compound imparts a modified property to the substrate, and wherein the substrate is formable.

The skilled person will appreciate that the glass filaments in the type of pellets produced in accordance with WO 2009/080281 are not (yet) dispersed in the thermoplastic polymer of the sheath. The present inventors have found that this may result in glass filaments separating from the pellets when such pellets are subjected to repetitive mechanical loads. Such repetitive mechanical loads may occur during transport of the pellets through a piping system, or a vibrating conveyor means, such as a vibrating conveyor belt. Further repetitive mechanical loads occur when a number of pellets are shaken, stirred or when the pellets are filled into a suitable transport container, such as for example an octabin. In addition to that the transport container may be subject to vibrations during transport which may be another cause of glass filaments separating from the pellet. It should be understood that several variations of the above examples may also be considered as repetitive mechanical loads. The repetitive mechanical loads are usually random in nature.

Of particular importance is the separation of glass filaments from the pellets during transport of the pellets through a piping system because the separated filaments may cause blocking of the piping system and/or of filters, valves, outlets and the like that are used in the piping system. Such blocking may result in down time of the equipment and possible loss of production capacity.

The present inventors generally refer to the above problems as the "free glass" problem. The term "free glass" may be used throughout this description as alternative to the amount of glass filaments separating from the pellet.

Besides the problem relating to glass filaments separating from the pellets the present inventors observed that the type of pellets produced in accordance with WO 2009/080281 may sometimes result in so called "white spots" which are visible on the surface of the final product, for example an injection moulded part. The present inventors found that these "white spots" are agglomerates of glass filaments and the existence of such "white spots" indicates that the impregnation of the glass filaments was insufficient causing them to stay agglomerated in the moulded part rather than to disperse evenly therein.

An object of the present invention is to provide a solution for the problems associated with the free glass phenomenon.

More specifically, an object of the present invention is to provide pellets comprising a thermoplastic polymer sheath surrounding glass filaments, which glass filaments are covered at least in part with an impregnating agent and extend in a longitudinal direction of said pellets, wherein the amount of glass filaments separating from the pellet when the pellet is subjected to repetitive loads is reduced to a minimum.

A further object of the present invention is to provide pellets comprising a thermoplastic polymer sheath surrounding glass filaments, which glass filaments are covered at least in part with an impregnating agent and extend in a longitudinal direction of said pellets, wherein the amount of glass filaments separating from the pellet when the pellets are transported through a piping system, for example by means of air drag or when the pellets are transported by means of a vibrating conveyor means, such as a conveyor belt, is reduced to a minimum.

Another object of the present inventors is to improve the impregnation of the glass filaments in the pellets so that the number of "white spots" is reduced to a minimum.

To that extent the present inventors have found that, if the pellets are maintained for a period of time at an elevated temperature of at least the melting temperature of the impregnating agent, the amount of glass filaments separating from the pellets is significantly reduced when such pellets are transported and/or subjected to repetitive mechanical loads. As such the present invention provides a method for treatment of pellets comprising a thermoplastic polymer sheath surrounding glass filaments, which glass filaments are covered at least in part with an impregnating agent and extend in a longitudinal direction of the pellets, the method comprising maintaining the pellets for a period of time at an elevated temperature of at least the melting temperature of the impregnating agent.

In addition the present inventors found that the method of the invention results in a lower risk to formation of "white spots" in moulded parts manufactured from the treated pellets.

Without willing to be bound to it the present inventors believe that the treatment at elevated temperature establishes two effects.

First of all it allows the impregnating agent to enable an improved mechanical coupling between the glass filaments forming the core of the pellet and the thermoplastic polymer sheath surrounding the glass filaments.

Secondly it allows the impregnating agent to further diffuse into the spaces between the glass filaments which improves the coupling between the glass filaments. Said in a different way, the present invention allows an improved impregnation of the glass filaments.

Hence, the present invention allows the manufacture of pellets comprising a thermoplastic polymer sheath surrounding glass filaments, which glass filaments are covered at least in part with an impregnating agent and extend in a longitudinal direction of the pellets wherein the glass filaments are coupled to each other and to the thermoplastic polymer sheath, the combination thereof resulting in a reduced amount of glass filaments separating from the pellets and a reduced amount of "white spots".

In accordance with the present invention therefore at least one of the aforementioned objects is met.

In a preferred embodiment the pellets are maintained at the elevated temperature for a period of at least 15 minutes, preferably at least 30 minutes, more preferably at least 60 minutes. The elevated temperature during the treatment, the treatment temperature, at least equals the melting temperature of the impregnating agent as this allows the impregnating agent to migrate along the interface between the glass filaments and the thermoplastic polymer sheath and between the glass filaments. The higher the elevated temperature during the treatment, the shorter the period of treatment may be while obtaining a similar effect on free glass and/or "white spots".

In practice the present invention may be carried out by placing the pellets in a suitable treatment vessel which may be heated for example by means of heating the walls of the vessel and/or by purging the vessel with pre-heated gas. In such embodiments the pellets are not heated directly but indirectly and some time is needed to heat up the pellets to the desired temperature. In another embodiment pellets may be heated by means or IR radiation. The present invention is in no way limited to either of these heating methods or any combination of heating methods.

The skilled person will understand that the elevated temperature may be constant throughout the period of treatment, but may also vary.

The treatment is of particular importance for pellets containing a relatively high amount of glass filaments, i.e. pellets containing at least 40 wt % preferably at least 50 wt % of glass filaments because such pellets are more susceptible to the problems of "free glass" and "white spots".

To avoid pellets melting together during the treatment, the elevated temperature is preferably lower than the melting temperature of the thermoplastic polymer of the thermoplastic polymer sheath.

Hence, in a preferred embodiment of the present invention, the impregnating agent has a melting temperature lower than a melting temperature of the thermoplastic polymer sheath and the elevated temperature is lower than the melting temperature of the thermoplastic polymer sheath.

Preferably the pellets have a length from 5-50 mm, preferably from 5-30 mm, more preferably from 10-20 mm and most preferably from 12-15 mm. Pellets having a length of over 20 mm may be more difficult to process in an injection moulding equipment and/or would require modification of such equipment. Longer pellets, such as from 20 mm to 50 mm may be suitable for compression moulding techniques.

The pellets used in accordance with the present invention preferably contain from 10 to 70 wt %, preferably from 20 to 60 wt % of glass filaments based on the weight of the pellets. Normally the glass filaments in the pellets originate from glass multifilaments, sometimes referred to as glass rovings. Such a roving is a continuous strand of glass filaments which glass filaments are coated and held together by means of a sizing composition. For the avoidance of doubt it is to be understood that in such a continuous strand or roving the glass filaments are also continuous.

The glass filaments in the pellets of the present invention preferably have a thickness of from 5-50 µm preferably from 10-30 µm, more preferably from 15-25 µm. Usually the glass filaments are circular in cross section meaning the thickness as defined above would be the glass filament diameter.

The length of the glass filaments in a pellet typically corresponds to the length of the pellet. Small differences in length between the pellet and the glass filaments may nevertheless arise due to post-extrusion shrinkage of the thermoplastic polymer sheath or due to the applied pellet cutting technology. Such differences however are small and typically less than 10%, preferably less than 5%, more preferably less than 2% of the length of the pellet. The glass filaments generally lie in parallel to one another. For the avoidance of doubt it should be understood that the glass filaments as used in the present invention are not embedded in the thermoplastic polymer sheath.

The glass filaments preferably contain at most 2 wt % of a sizing composition based on the total weight of the glass filaments. Suitable examples of sizing compositions include solvent-based compositions, such as an organic material dissolved in aqueous solutions or dispersed in water and melt- or radiation cure-based compositions. More particularly, an aqueous sizing composition is traditionally applied on the individual glass filaments. As already disclosed in the art, e.g. in documents EP 1460166A1, EP 0206189A1 or U.S. Pat. No. 4,338,233, the aqueous sizing composition typically includes film formers, coupling agents and other additional components. The film formers are generally present in effective amount to protect glass filaments from inter-filament abrasion and to provide integrity and processability of glass filament strands after they are dried. Suitable film formers should be miscible with the polymer to be reinforced. For example, for reinforcing polypropylenes, suitable film formers generally comprise polyolefin waxes. The coupling agents are generally used to improve the adhesion between the thermoplastic polymer sheath, which in the moulded article will form the thermoplastic polymer matrix and the glass filament reinforcements. Suitable examples of coupling agents known in the art as being used for the glass filaments include organofunctional silanes. Any other additional components known to the skilled person may be present in the sizing composition. Suitable examples include lubricants, antistatic agents, crosslinking agents, plasticizers, surfactants, nucleation agents, antioxidants, pigments and any combinations thereof.

The thermoplastic polymer sheath is preferably a polyolefin composition, such as compositions based on polypropylene or polyethylene. More preferably the thermoplastic polymer sheath material in the pellet according to the invention is a crystalline polypropylene, such as propylene homopolymer, a random copolymer, or a heterophasic copolymer of propylene and ethylene and/or another alpha-olefin. The thermoplastic polymer sheath may contain one or more of additives like UV stabilisers, anti-oxidants, processing aids, impact-modifiers, flame-retardants, acid scavengers, inorganic fillers, colorants, or components that further enhance the properties of the reinforced compound, like compounds that enhance interfacial bonding between polymer and glass filaments. An example of the last compounds is a functionalized polyolefin, like a maleated polypropylene, in case the thermoplastic polymer is a polypropylene.

Although it is preferred that the thermoplastic polymer sheath consists of a single layer, the present invention is not limited to such an embodiment. To that extent the thermoplastic polymer sheath surrounding the glass filaments may be surrounded by one or more layers of (a) thermoplastic polymer(s) which is/are extruded directly over the thermoplastic polymer sheath and as such in direct contact with the latter. For the avoidance of doubt it is to be understood that the thermoplastic polymer sheath intimately surrounds the glass filaments which are at least partially covered with the impregnating agent. The term intimately surrounding as used herein is to be understood as meaning that the thermoplastic polymer sheath substantially entirely contacts the core containing the at least partially covered glass filaments. Said in another way the sheath is applied in such a manner that there is no deliberate gap between an inner surface of the sheath and the core containing the glass filaments.

In a further aspect the present invention is directed to a method for reducing an amount of glass filaments separating from pellets comprising a thermoplastic polymer sheath surrounding the glass filaments, which glass filaments are covered at least in part with an impregnating agent and extend in a longitudinal direction of said pellets, when such pellets are subjected to repetitive mechanical loads or upon transportation of the pellets through a piping system or by means of a vibrating conveyor means, the method comprising the steps of:
  a) providing at least one continuous strand of glass filaments, and
  b) applying an impregnating agent to said strand,
  c) applying a sheath of thermoplastic polymer around the strand of step b) to form a sheathed continuous strand of glass filaments covered at least in part with said impregnating agent,
  d) cutting the sheathed continuous strand of glass filaments covered at least in part with said impregnating agent to pellets,
  e) treating the pellets with a method according to the present invention.

In yet a further aspect the present invention relates to a method for reducing agglomerations of glass filaments in moulded parts manufactured by moulding pellets comprising a thermoplastic polymer sheath surrounding the glass filaments, which glass filaments are covered at least in part with an impregnating agent and extend in a longitudinal direction of said pellets, the method comprising the steps of:
  a) providing at least one continuous strand of glass filaments, and
  b) applying an impregnating agent to said strand,
  c) applying a sheath of thermoplastic polymer around the strand of step b) to form a sheathed continuous strand of glass filaments covered at least in part with said impregnating agent,
  d) cutting the sheathed continuous strand of glass filaments covered at least in part with said impregnating agent to pellets,
  e) treating the pellets with a method according to the present invention.

Any method known in the art to apply a sheath of thermoplastic polymer around the continuous strand of glass filaments may be used. The sheathing or wire-coating process typically involves the application of a thermoplastic polymer layer on the outer surface of the continuous glass strand as it passes through the thermoplastic polymer melt in a die. Documents EP092191981 and EPP099497881 for example disclose a sheathing or wire-coating method. According to the present invention, the resulting sheathed continuous strand of glass filaments comprises a core containing the glass filaments that are at least partially covered with an impregnating agent and a sheath intimately surrounding the glass filaments.

The continuous strand of glass filaments, sometimes referred to as roving, is usually provided from a bobbin on which it is wound. A continuous strand of glass filaments which contains at most 2 wt % of a sizing composition is employed in methods of the present invention. Preferably, a continuous strand of glass filaments containing from 0.1 to 1 wt % of sizing composition, as determined by loss on ignition (LOI) is used. The measurement of LOI is a well-known for determining the amount of sizing on glass filaments. The glass filament density of the continuous strand of glass filaments may vary. Preferably, the continuous strand of glass filaments may contain from 500 to 10000 glass filaments per strand, more preferably from 2000 to 5000 glass filaments per strand. The linear density of the strand preferably is from 1000 to 5000 tex, corresponding to 1000 to 5000 grams per 1000 meter. The thickness of the glass filaments preferably is from 5-50 µm, more preferably from 10-30 µm, even more preferably from 15-25 µm. Usually the glass filaments are circular in cross section meaning the thickness as defined above would mean diameter.

The method for producing pellets according to the present invention comprises a step of applying an impregnating agent to said at least one continuous strand. Preferably the amount of impregnating agent is from 0.5 to 20 wt % based on the combined weight of the glass filaments (which include the sizing composition) in the pellets. The step of applying the impregnating agent is carried out after unwinding the packaged continuous strand of glass filaments containing the sizing composition, and in-line with the step of applying the thermoplastic polymer sheath around the strand of glass multifilaments. "In-line" means that no intermediate steps, such as for example storage or cooling, are performed between the step of applying the impregnating agent and the step of applying the thermoplastic polymer sheath. In practice both steps may be performed directly after each other, meaning for example that the impregnating agent still has relatively high temperature.

The impregnating agent has at least two functions. Firstly it couples the glass filaments, at least in part, to each other and to the thermoplastic polymer sheath. This function is important in view of reducing the amount of glass filaments separating from the pellets when such pellets are subjected to repetitive mechanical loads or upon transportation of the pellets through a piping system, for example by means of air drag or upon transportation by means of a vibrating conveyor means, such as a conveyor belt. Secondly the impregnating agent is a compound that enhances the dispersion of the glass filaments in the thermoplastic polymer matrix during a moulding process wherein pellets are moulded into articles. In view of these functions the better the impregnating agent impregnates the glass filaments during the manufacture of the pellets, the better the dispersion of the glass filaments will be in the end-product (i.e. the injection moulded part) resulting in fewer "white spots". In addition the free glass problem is reduced to a minimum. The method for treatment of the present invention further improves the impregnation.

The impregnating agent is non-volatile, has a melting point of at least about 20° C. below the melting point of the thermoplastic polymer sheath and has a viscosity of from 2.5 to 100 cS at application temperature.

The viscosity of the impregnating agent is lower than 100 cS, preferably lower than 75 cS and more preferably lower than 25 cS at application temperature. The viscosity of the impregnating agent is higher than 2.5 cS, preferably higher than 5 cS, and more preferably higher than 7 cS at the application temperature. An impregnating agent having a viscosity higher than 100 cS is difficult to apply to the continuous strand of glass filaments. Low viscosity is needed to facilitate good wetting performance of the glass filaments, but an impregnating agent having a viscosity lower than 2.5 cS is difficult to handle, e.g., the amount to be applied is difficult to control. The melting temperature of the impregnating agent is at least about 20° C., preferably at least 25° C. or at least 30° C. below the melting point of the thermoplastic polymer sheath. The application temperature of the impregnating agent is selected such that the desired viscosity range is obtained. The amount of impregnating agent that is applied depends inter alia on the thermoplastic polymer used for the sheath, the size (diameter) of the glass filaments of the continuous strand, and on the type of sizing that is on the surface of the glass filaments. According to the present invention, the amount of impregnating agent applied to the continuous strand of glass filaments should be higher than 0.5 wt %, preferably higher than 2 wt %, more preferably higher than 4 wt %, more preferably higher than 6 wt % based on the weight of the glass filaments (including the sizing composition). The amount of impregnating agent should be lower than 20 wt % preferably lower than 18 wt %, more preferably lower than 15 wt % more preferably lower than 12 wt %. A certain minimum amount of impregnating agent is needed to assist homogeneous dispersion of glass filaments in the thermoplastic polymer matrix during moulding. An excess of impregnating agent may result in decrease of mechanical properties of the moulded articles. Suitable examples of impregnating agents for use in combination with polypropylene as the material for the sheath may comprise highly branched poly(alpha-olefins), such as polyethylene waxes, modified low molecular weight polypropylenes, mineral oils, such as, paraffin or silicon and any mixtures of these compounds. Preferably, the impregnating agent comprises a highly branched poly(alpha-olefin) and, more preferably, the impregnating agent is a highly branched polyethylene wax. The wax may optionally be mixed with a hydrocarbon oil or wax like a paraffin oil to reach the desired viscosity. WO 2009/080281 discloses as an impregnating agent a blend of 30 wt % Vybar 260 (hyper branched polymer supplied by Baker Petrolite) and 70 wt % Paralux oil (paraffin, supplied by Chevron). According to the present invention the impregnating agent is non-volatile, and substantially solvent-free. Non-volatile means that the impregnating agent does not evaporate under the application and processing conditions applied. In the context of the present invention, "substantially solvent-free" means that the impregnating agent contains less than 10% by mass of solvent, preferably less than 5% by mass solvent. Most preferably, the impregnating agent does not contain any solvent. The impregnating agent may further be mixed with other additives known in the art such as lubricants, antistatic agents, UV stabilizers, plasticizers, surfactants, nucleation agents, antioxidants, pigments, dyes, adhesion promoters, such as a maleated polypropylene, provided the viscosity remains within the desired range.

Any method known in the art may be used for applying the liquid impregnating agent to the continuous strand of glass filaments. Suitable methods for applying the impregnating agent include applicators having belts, rollers, and hot melt applicators. Such methods are for example disclosed in documents EP0921919, EP0994978B 1, EP0397505B1 and references cited therein.

The present invention further relates to a method for filling a transport container containing pellets, which pellets comprise a thermoplastic polymer sheath surrounding glass filaments, which glass filaments are covered at least in part with an impregnating agent and extend in a longitudinal direction of the pellets, the method comprising the steps of treating the pellets after their production using the method of the present invention followed by transporting the pellets through a piping system to a filling station, followed by filling a transport container with the pellets from said filling station. Suitable transport containers are known to the skilled person and include bags, jumbo bags, boxes, octabins, bulk containers and the like.

The present invention will now be further explained by the following figures and examples which should not be considered as limiting the present invention in any way.

FIG. 1 schematically shows a pellet in accordance with the present invention.

Figure 2:
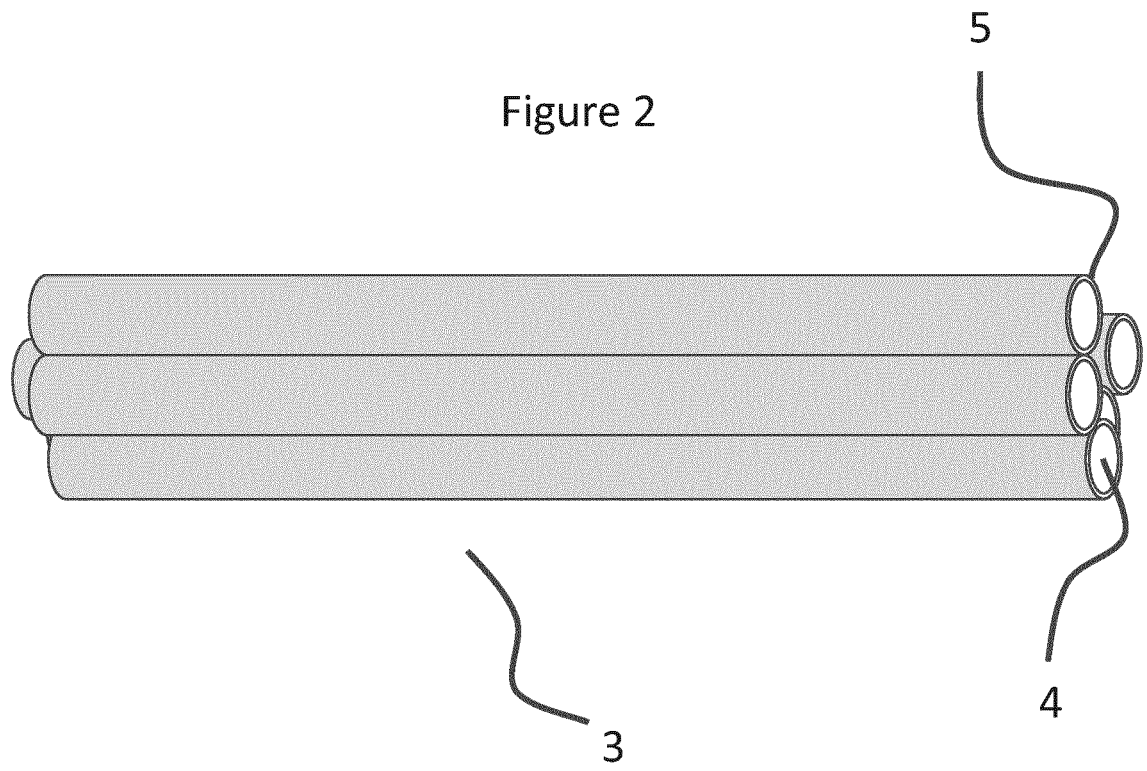

FIG. 2 schematically shows some of the glass filaments of the pellet of FIG. 1.

FIG. 1 is a schematic drawing (not to scale) of a pellet in accordance with the present invention. Pellet 1 comprises a thermoplastic polymer sheath 2 surrounding glass filaments 3, which glass filaments are covered at least in part with an impregnating agent (not shown) and extend in a longitudinal direction of the pellets. A number of glass filaments 3 are shown enlarged in FIG. 2. Glass filaments 3 comprise a glass core 4 and a sizing composition 5. Sizing composition 5 is shown to fully encapsulate glass core 4. A skilled person will nevertheless understand that FIG. 2 is a mere schematic representation and that in reality glass core 4 may not be fully surrounded by sizing composition 5. In addition, sizing composition 5 may form a layer encapsulating more than one glass cores 4.

An impregnating agent (not shown) is present between some or all of the individual glass filaments 3 and/or between glass filaments 3 and thermoplastic polymer sheath 2.

EXAMPLES 1-10

A sheathed continuous strand of glass filaments, which glass filaments are covered at least in part with an impregnating agent was manufactured in accordance with the method of WO 2009/080281.

The continuous strand of glass filaments had a linear density of 3000 Tex and contained 0.6 wt % of a sizing composition. The strand was provided with 8 wt % of an impregnating agent, which was a blend comprising a highly branched α-olefin and microcrystalline wax and having a drop melting point of 77° C. and a viscosity at 100° C. of 50 mPa·s.

Following the application of the impregnating agent a propylene homopolymer sheath of SABIC PP 579 S, having an MFI of 47 g/10 min (ISO 11330, 2.16 kg @ 230° C.) was provided around the continuous strand of glass filaments in such a manner that the propylene homopolymer intimately surrounded the continuous strand. The so sheathed strand of glass filaments was cooled in a water bath and was then cut into pellets having a length of 12 mm. The pellets contained 60 wt % of glass filaments based on the weight of the pellets.

Samples of the pellets were maintained at temperatures of 90° C., 110° C. and 130° C. in an oven for different periods. An overview can be found in Table 1 below.

The tendency for glass filaments separating from the pellets was measured using the so called "push out" test, which test involves the manual testing of 100 pellets randomly selected from a batch of pellets. An operator tries to push out glass filaments from a pellet using a needle having a blunt tip with a surface area smaller than the surface area of the core of the pellet, i.e. the surface area occupied by the glass filaments. In practice a paper clip may be used for this purpose. The amount of successful "push outs" per 100 tested pellets is reported. The "push out" behaviour was found to correlate with the amount of free glass measured with other methods and/or observed in practice. Hence, the higher the push out number is the higher the amount of glass filament that will separate from the pellets will be. The push out test was carried out after cooling the treated pellets from the examples to room temperature.

Table 1 below shows the normalized results of the push out test wherein Example 1 is regarded as the reference example and is not according to the present invention.

TABLE 1

| | Treatment time [min] | Push out [—] | | |
|---|---|---|---|---|
| | | 90° C. | 110° C. | 130° C. |
| Ex. 1 | — | 1 | 1 | 1 |
| Ex. 2 | 15 | 0.75 | 0.79 | 0.35 |
| Ex. 3 | 30 | 0.56 | 0.55 | 0.20 |
| Ex. 4 | 45 | 0.50 | 0.42 | 0.15 |
| Ex. 5 | 60 | 0.31 | 0.24 | 0.25 |
| Ex. 6 | 75 | 0.25 | 0.18 | 0.20 |
| Ex. 7 | 90 | 0.19 | 0.12 | 0.10 |
| Ex. 8 | 105 | 0.19 | 0.12 | 0.00 |
| Ex. 9 | 120 | 0.06 | 0.12 | 0.05 |
| Ex. 10 | 180 | 0.00 | 0.12 | 0.00 |

From Table 1 it is clear that the push-out improves significantly if the pellets are maintained at elevated temperature for a certain amount of treatment time. In addition it can be observed that a higher temperature will result in a better push out behaviour at shorter treatment times.

EXAMPLES 11-18

In all examples 11-18 a sheathed continuous strand of glass filaments, which glass filaments are covered at least in part with an impregnating agent was manufactured in accordance with the method of WO 2009/080281.

Each of the examples 11-18 consists of several production runs and the Table 2 below provides average values for the measured performance in terms of "push out" results. Similar to the presentation of the results of Examples 1-10 the push out results are normalised.

The continuous strand of glass filaments had a linear density of 3000 Tex and comprised 0.6 wt % of a sizing composition. The strand was provided with 8 wt % of an impregnating agent, which was a blend comprising a highly branched α-olefin and microcrystalline wax and having a drop melting point of 77° C. and a viscosity at 100° C. of 50 mPa·s.

In examples 11-18 the type of polymer and the amount of glass filaments was varied. The amount of glass filaments was varied by changing the thickness of the thermoplastic polymer sheet surrounding the 3000 tex continuous strand. Table 2 provides an overview of these variations.

The propylene copolymer was SABIC PP 513 MNK 10 having MFI of 70 g/10 min (ISO 1133, 2.16 kg @ 230° C.).

The propylene homopolymer was SABIC PP 579 S, having an MFI of 47 g/10 min (ISO 11330, 2.16 kg @ 230° C.

Following the application of the polypropylene sheath around the continuous strand of glass filaments the so sheathed strand of glass filaments was cooled in a water bath and then cut into pellets having a length of 12 mm. The pellets contained an amount of glass filaments as indicated in Table 2 below.

After cutting, samples of the pellets were maintained at a temperatures of 110° C. for a period of 120 minutes.

TABLE 2

|  | Polypropylene | Glass content [wt %] | Push out Reference [—] | Push out 110° C./120 min [—] |
|---|---|---|---|---|
| Ex. 11 | Copolymer | 20 | 1 | 0.38 |
| Ex. 12 | Homopolymer | 20 | 1 | 0 |
| Ex. 13 | Copolymer | 30 | 1 | 0.44 |
| Ex. 14 | Homopolymer | 30 | 1 | 0.37 |
| Ex. 15 | Homopolymer | 40 | 1 | 0.26 |
| Ex. 16 | Copolymer | 60 | 1 | 0.29 |
| Ex. 17 | Homopolymer | 60 | 1 | 0.19 |

The invention claimed is:

1. A method for treatment of pellets comprising a thermoplastic polymer sheath surrounding glass filaments, which glass filaments are covered at least in part with an impregnating agent and extend in a longitudinal direction of the pellets, the method comprising maintaining the pellets, which comprise the thermoplastic polymer sheath surrounding the glass filaments that are covered at least in part with the impregnating agent, for a period of time at an elevated temperature of at least the melting temperature of the impregnating agent such that the impregnating agent migrates along an interface between the glass filaments and the thermoplastic polymer sheath and between the glass filaments; wherein the maintaining at the elevated temperature comprises diffusion of the impregnating agent into spaces between the glass filaments; and wherein the melting temperature of the impregnating agent is lower than a melting temperature of the thermoplastic polymer sheath and wherein the elevated temperature is lower than the melting temperature of the thermoplastic polymer sheath.

2. The method according to claim 1 wherein
the pellets are maintained at the elevated temperature for a period of at least 60 minutes,
the elevated temperature is between 90° C. and 130° C.,
the thermoplastic polymer sheath comprises a propylene homopolymer, and
the pellets comprise at least 50 wt % of glass filaments.

3. The method according to claim 1, wherein the thermoplastic polymer sheath is a polyolefin composition.

4. The method according to claim 1, wherein the glass filaments have a thickness of from 5-50 μm.

5. The method according to claim 1, wherein the glass filaments contain at most 2 wt % of a sizing composition based on the total weight of the glass filaments.

6. The method according to claim 1, wherein the impregnating agent is non-volatile, has a melting point of at least 20° C. below the melting point of the thermoplastic polymer sheath, has a viscosity of from 2.5 to 100 cS at application temperature.

7. Pellets formed by the method according claim 1, said pellets comprising a thermoplastic polymer sheath surrounding glass filaments, which glass filaments are covered at least in part with an impregnating agent and extend in a longitudinal direction.

8. A method for producing pellets comprising a thermoplastic polymer sheath surrounding glass filaments, which glass filaments are covered at least in part with an impregnating agent and extend in a longitudinal direction of the pellets, the method comprising the steps of:
a) providing at least one continuous strand of glass filaments, and
b) applying an impregnating agent to said strand,
c) applying a sheath of thermoplastic polymer around the strand of step b) to form a sheathed continuous strand of glass filaments covered at least in part with said impregnating agent,
d) cutting the sheathed continuous strand of glass filaments covered at least in part with said impregnating agent to pellets and
e) treating the pellets with a method according to claim 1.

9. The method according to claim 8, wherein applying said impregnating agent to said strand comprises using a hot melt applicator to apply the impregnating agent in a molten state.

10. A method for reducing agglomerations of glass filaments in moulded parts manufactured by moulding pellets comprising a thermoplastic polymer sheath surrounding the glass filaments, which glass filaments are covered at least in part with an impregnating agent and extend in a longitudinal direction of said pellets, the method comprising the steps of:
a) providing at least one continuous strand of glass filaments, and
b) applying an impregnating agent to said strand,
c) applying a sheath of thermoplastic polymer around the strand of step b) to form a sheathed continuous strand of glass filaments covered at least in part with said impregnating agent,
d) cutting the sheathed continuous strand of glass filaments covered at least in part with said impregnating agent to pellets,
e) treating the pellets with a method according to claim 1.

11. The method according to claim 1,
wherein the pellets are maintained at the elevated temperature for a period of at least 15 minutes;
wherein the glass filaments have a thickness of from 5-50 μm; and
wherein the glass filaments contain at most 2 wt % of a sizing composition based on the total weight of the glass filaments.

12. The method according to claim 11, wherein the thermoplastic polymer sheath is a polyolefin composition.

13. The method according to claim 11, wherein the pellets have a length of from 5-50 mm.

14. The method according to claim 11, wherein the period of time is at least 30 minutes.

15. A method for filling a transport container containing pellets, which pellets comprise a thermoplastic polymer sheath surrounding glass filaments, which glass filaments are covered at least in part with an impregnating agent and extend in a longitudinal direction of the pellets, the method comprising: treating the pellets after their production using the method of claim 1 followed by transporting the pellets through a piping system to a filling station, followed by filling a transport container with the pellets from the filling station.

16. The method according to claim 1, wherein maintaining the pellets, which comprise the thermoplastic polymer sheath surrounding the glass filaments that are covered at least in part with the impregnating agent, for a period of time at an elevated temperature of at least the melting temperature of the impregnating agent melts the impregnating agent and does not melt the sheath surrounding the glass filaments.

17. A method for treatment of pellets comprising a thermoplastic polymer sheath surrounding glass filaments, the method comprising:
 covering glass filaments at least in part with an impregnating agent; and
 after covering the glass filaments at least in part with that impregnating agent, maintaining the pellets for a period of time at an elevated temperature of at least the melting temperature of the impregnating agent such that the impregnating agent migrates along an interface between the glass filaments and the thermoplastic polymer sheath and between the glass filaments and lower than the melting temperature of the thermoplastic polymer sheath,
 wherein the maintaining at the elevated temperature comprises diffusion of the impregnating agent into spaces between the glass filaments, and
 wherein the melting temperature of the impregnating agent is lower than a melting temperature of the thermoplastic polymer sheath.

18. The method of claim 17, wherein covering the glass filaments at least in part with the impregnating agent comprises applying a molten impregnating agent to the glass filaments.

19. A method for treatment of pellets comprising a thermoplastic polymer sheath surrounding glass filaments, which glass filaments are covered at least in part with an impregnating agent and extend in a longitudinal direction of the pellets, the method comprising maintaining the pellets for a period of time at an elevated temperature of at least the melting temperature of the impregnating agent to melt the impregnating agent such that the impregnating agent migrates along an interface between the glass filaments and the thermoplastic polymer sheath and between the glass filaments; wherein the maintaining at the elevated temperature comprises diffusion of the impregnating agent into spaces between the glass filaments; and wherein the melting temperature of the impregnating agent is lower than a melting temperature of the thermoplastic polymer sheath and wherein the elevated temperature is lower than the melting temperature of the thermoplastic polymer sheath.

20. The method of claim 19, wherein maintaining the pellets for a period of time at an elevated temperature of at least the melting temperature of the impregnating agent to melt the impregnating agent such that the impregnating agent migrates along an interface between the glass filaments and the thermoplastic polymer sheath and between the glass filaments does not comprise melting the sheath surrounding the glass filaments.

* * * * *